United States Patent
Lin et al.

(10) Patent No.: US 8,267,595 B2
(45) Date of Patent: Sep. 18, 2012

(54) ONE-PIECE LC TYPE OPTICAL FIBER ADAPTER

(75) Inventors: I En Lin, Taipei (TW); Tomoyuki Mamiya, Ibaraki (JP)

(73) Assignees: Protai Photonic Co., Ltd., Taipei County (TW); Senko Sangyo Co., Ltd., Mie (JP)

(*) Notice: Subject to any disclaimer, the term of this patent is extended or adjusted under 35 U.S.C. 154(b) by 296 days.

(21) Appl. No.: 12/791,984

(22) Filed: Jun. 2, 2010

(65) Prior Publication Data

US 2010/0239220 A1    Sep. 23, 2010

Related U.S. Application Data

(63) Continuation-in-part of application No. 12/199,581, filed on Aug. 27, 2008, now abandoned.

(51) Int. Cl.
*G02B 6/36* (2006.01)
(52) U.S. Cl. .......................................... 385/55
(58) Field of Classification Search .................. None
See application file for complete search history.

(56) References Cited

U.S. PATENT DOCUMENTS

| 5,317,663 | A | 5/1994 | Beard et al. |
| 5,481,634 | A | 1/1996 | Anderson et al. |
| 5,937,121 | A | 8/1999 | Ott et al. |
| 6,619,856 | B1 | 9/2003 | Lampert et al. |
| 6,908,233 | B2 | 6/2005 | Nakajima et al. |
| 6,932,514 | B2 | 8/2005 | Anderson et al. |
| 7,972,066 | B1 * | 7/2011 | Lin et al. ............... 385/55 |
| 2010/0239220 | A1 | 9/2010 | Lin et al. |

FOREIGN PATENT DOCUMENTS

JP    2008026778 A    2/2008

OTHER PUBLICATIONS

US Office Action for U.S. Appl. No. 12/775,764, mailed Dec. 13, 2010.

* cited by examiner

*Primary Examiner* — Mike Stahl

(57) ABSTRACT

A one-piece LC type optical fiber adapter is provided. The LC type adapter of the present invention has fewer parts than a conventional one. Therefore, it is simpler and easier to assemble the LC type adapter of the present invention. In addition, the main body of the LC type adapter is unitary thereby avoiding the prior art problem that the stresses cause the two halves of the adapter to separate from each other after time.

6 Claims, 5 Drawing Sheets

ONE-PIECE LC TYPE OPTICAL FIBER ADAPTER

CROSS REFERENCE TO RELATED APPLICATION

This application is a continuation-in-part application of U.S. Ser. No. 12/199,581 filed Aug. 27, 2008, the full disclosure of which is incorporated herein by reference.

BACKGROUND OF THE INVENTION

1. Field of the Invention

The present invention relates to a fiber adapter, and more particularly, to a one-piece LC type optical fiber adapter.

2. Description of the Related Art

Fiber optics has revolutionized communication through out the world. With the increased used of fiber optics it has become increasingly important to be able to connect and disconnect fiber optic cables from various sources. Two fiber optic cables can be optically coupled so that they are in communication with each other by using connectors and an adapter, thereby putting each fiber optic cable in communication with the other. The connectors are placed on the end of each cable and then plugged into the adapter. The adapter has two openings each one designed to receive a connector.

The conventional LC type adapter consists of two halves, each halve being identical. Each half consists generally of a rectangular cylinder having a flange at one end. Inside each half would be placed half of an inner housing. The inner housing is generally a round cylinder with a flange at one end. Each adapter half has a ridge located just inside from its flange so that the inner housing could be placed in the adapter through the opening proximate to the flange on the adapter half. Once the inner housing is inserted into each adapter half, the two halves are connected by ultrasonically welding the two flanges of the adapter halves together.

However, the above design presents serious problems. The cables are naturally flexed in use when the adapter remains fixed. The related stress of this situation can cause the two halves of the adapter to separate from each other after time. In the prior art, this problem can be solved by constructing the adapter halves from metal which gives the adapter enough strength to withstand these stresses. However, this too presented a problem as metal is much more expensive to purchase and mold than the plastic one.

Accordingly, there exists a need to provide a LC type optical fiber adapter to solve the aforesaid problems.

SUMMARY OF THE INVENTION

It is an object of the present invention to provide a one-piece LC type optical fiber adapter that has fewer parts than a conventional one. It is simpler and easier to assemble the LC type adapter of the present invention. In addition, the main body of the LC type adapter is unitary thereby avoiding the prior art problem that the stresses cause the two halves of the adapter to separate from each other after time.

In order to achieve the above object, the one-piece LC type optical fiber adapter of the present invention includes a unitary main body, an inner housing and a cover. The unitary main body has an axial cavity defined by a first side-wall, a second side-wall, a third side-wall and a fourth side-wall. The first side-wall faces the third side-wall and connects with the second and fourth side-walls. The main body has two opposing axial openings. At least one compartment wall is positioned in the axial cavity. The compartment wall is parallel to the second and fourth side-walls and connects with the first and third side-walls and divides the axial cavity into a plurality of parts. The first side-wall has an access opening thereon. An indentation is formed on the top of the compartment wall. A pair of parallel ridges is positioned on the inner surface of the third side-wall and divides the compartment wall into two halves. The two ridges define a first groove. The second side-wall has a second groove on the inner surface thereof and the fourth side-wall has a third groove on the inner surface thereof. The first groove is in communication with the second and third grooves. A plurality of protrusions is located near the two axial openings on the inner surfaces of the second and fourth side-walls and on opposite sides of the compartment wall, respectively. The inner housing has a flange and a plurality of hollow cylinders through the flange. The cover is configured to cover the access opening on the first side-wall, wherein the cover has a protruding portion formed thereon and a protrusion formed on the protruding portion. The protruding portion is positioned corresponding to the indentation on the top of the compartment wall. The axial cavity of the main body is adapted to receive the inner housing and the first, second and third grooves are adapted to receive the flange. The inner housing can be slid into place within the main body through the opening on the first side-wall. The indentation on the top of the compartment wall is configured to receive the protruding portion and molten protrusion on the cover when the protrusion on the cover is melted and the cover is brought to cover the access opening.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
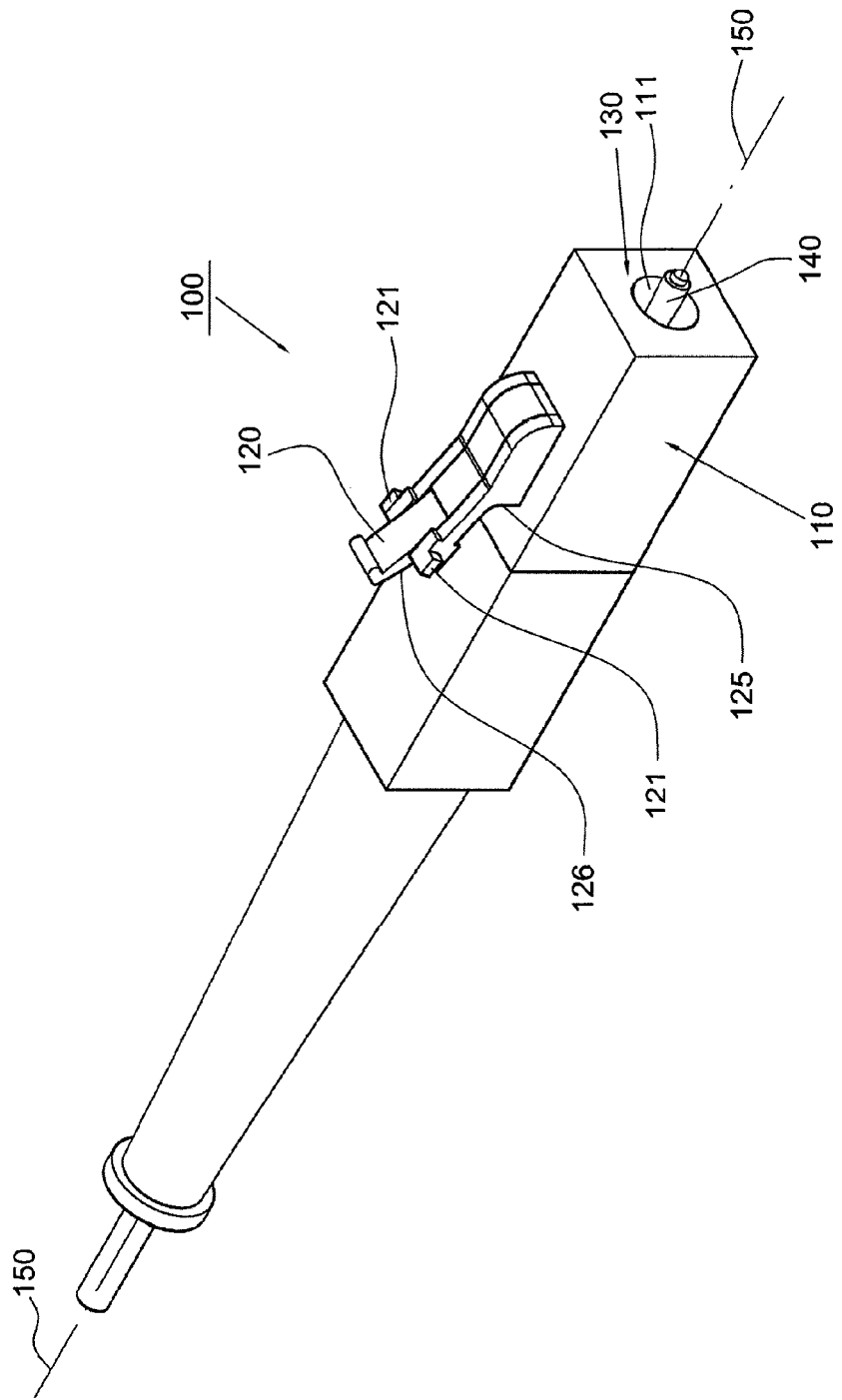
FIG. 1 is an elevated perspective view of a conventional LC type fiber connector.
Figure 2:
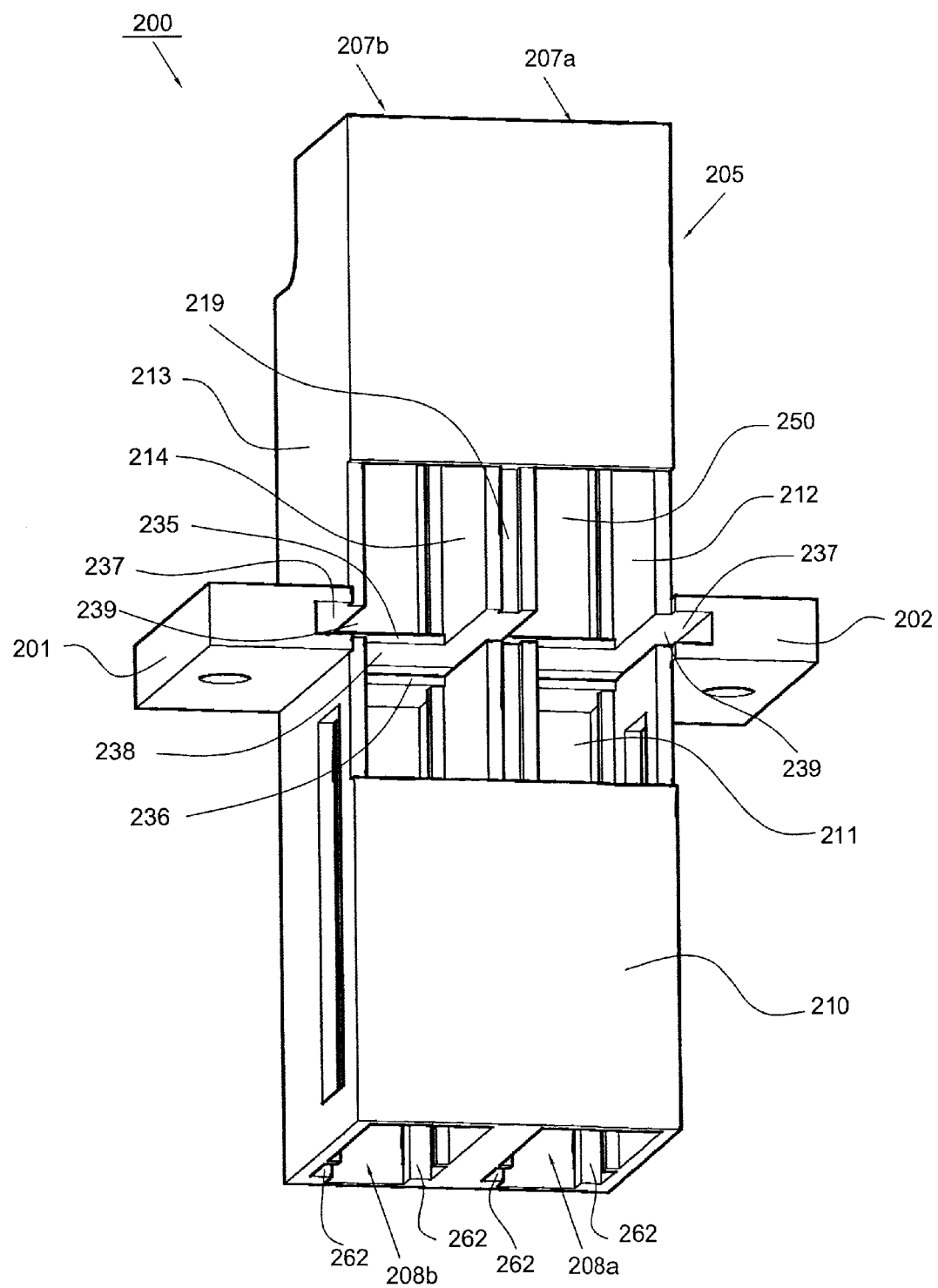
FIG. 2 is an elevated perspective view of the main body of the fiber adapter according to the present invention.
Figure 3:
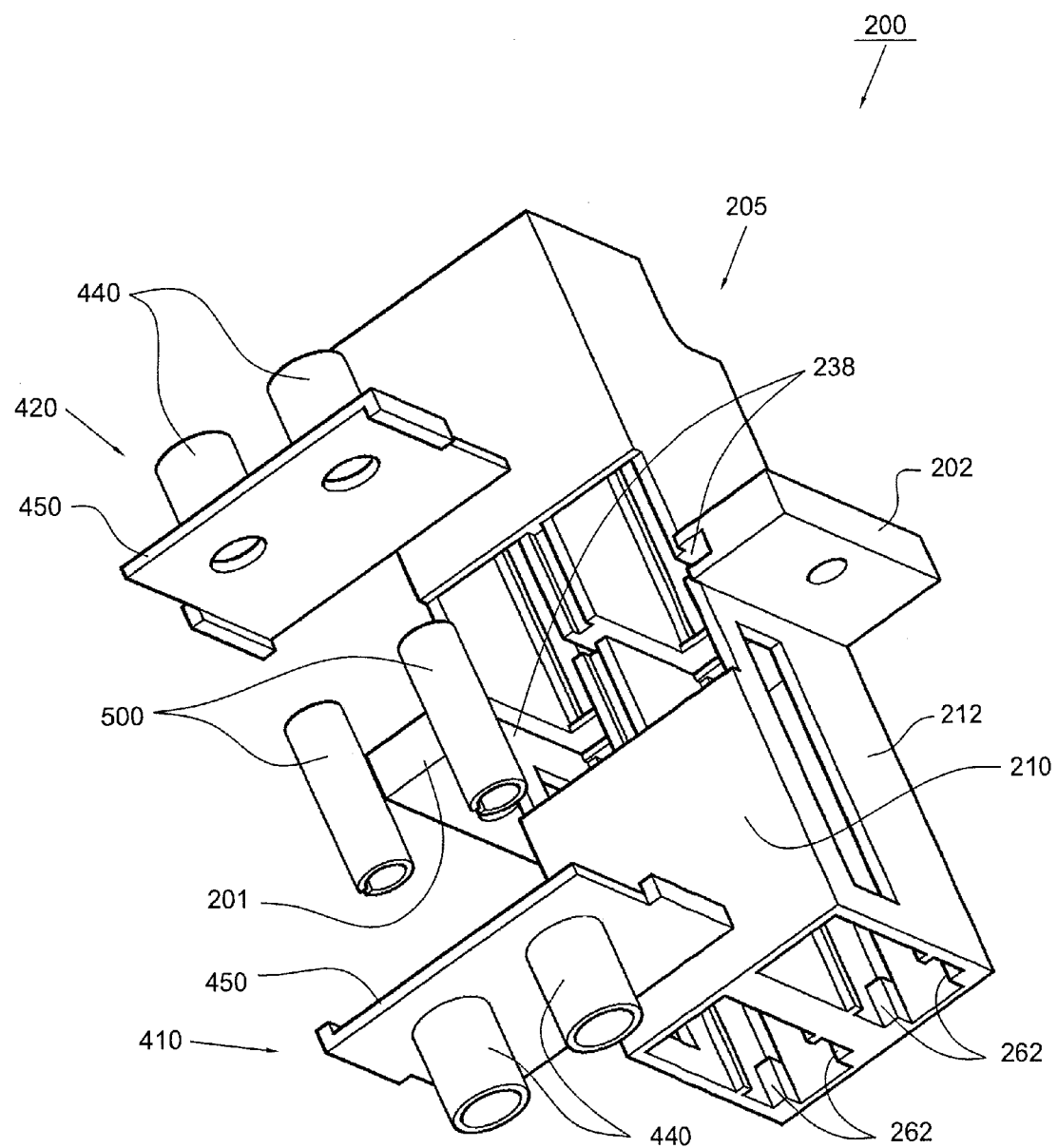
FIG. 3 is an exploded view of the fiber adapter of the present invention.
Figure 4:
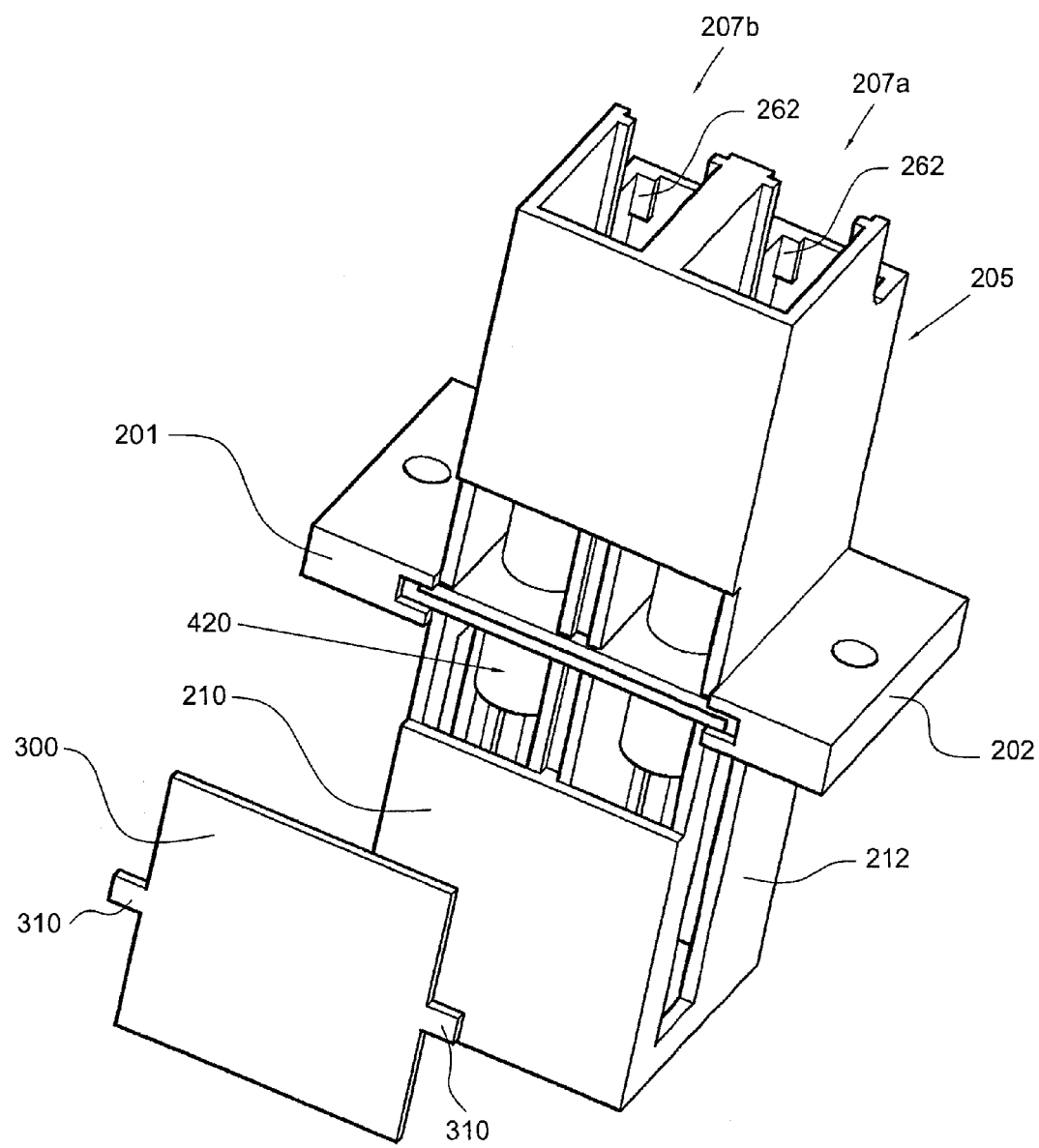
FIG. 4 is an elevated perspective view of the fiber adapter of the present invention, wherein the inner housing has been placed in the main body.
Figure 5:
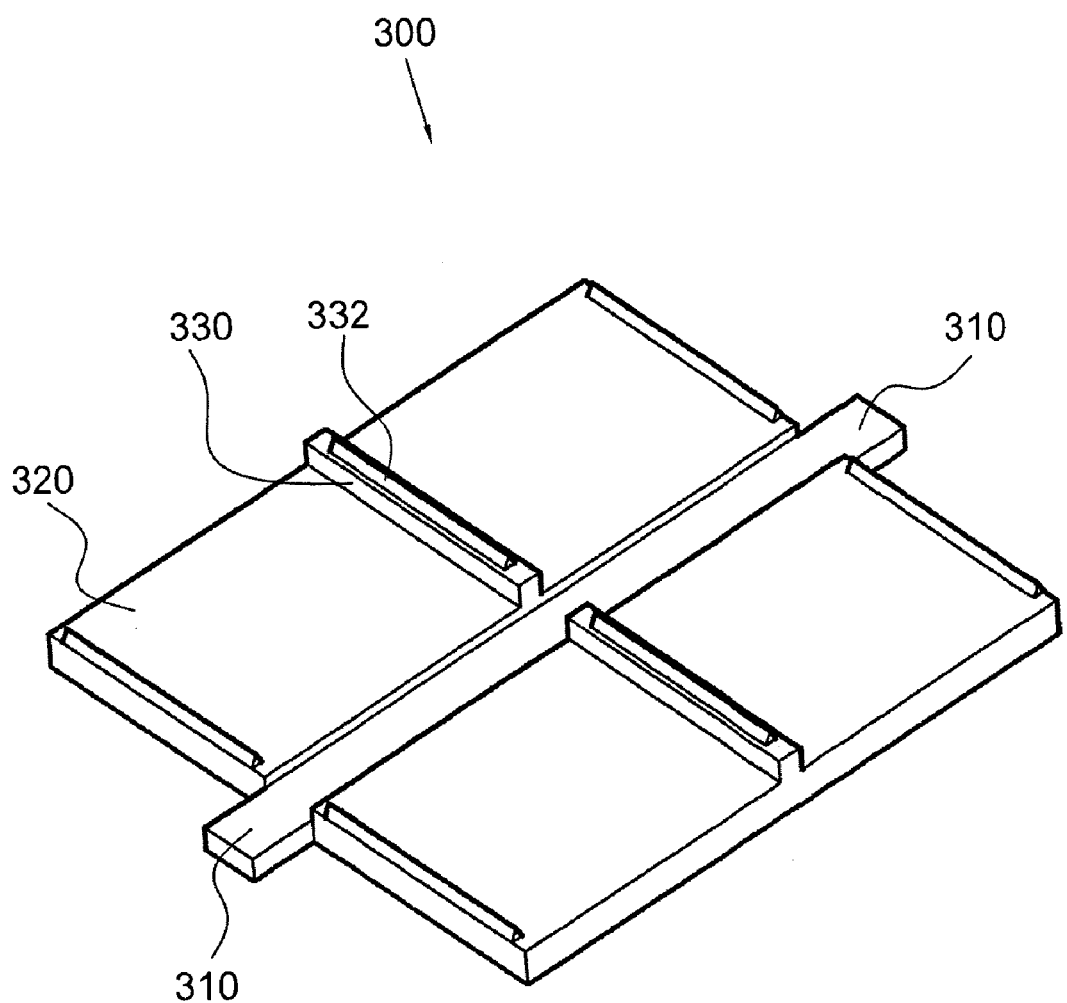
FIG. 5 is an elevated perspective view of the cover of the fiber adapter according to the present invention.

Referring to FIG. 1, a conventional LC type fiber connector 100 has a generally rectangular shape with a square cross section. The outer surface of the connector 100 includes a spring latch 120. The spring latch 120 is molded into the outer housing of the connector and includes a living hinge 125 which allows tab 126 to be moved up and down in a direction perpendicular to the central axis 150-150 of the connector 100. In addition, a ferrule 140 protrudes from the opening 111 of a two-piece assembly comprising housing 110 and cover 130 which have been ultrasonically bonded together. A spring (not shown in the figure) is located inside the two-piece assembly to allow the ferrule 140 to move back and forth through the opening 111. The spring latch 120 includes a pair of shoulders 121 that are positioned on opposite sides of the tab 126.

Referring to FIGS. 2 to 5, the duplex fiber adapter 200 of the present invention includes a unitary molded main body 205 and a cover 300. In the preferred embodiment, the main body 205 has an axial cavity defined by top side-wall 210, bottom side-wall 211, right side-wall 212 and left side-wall 213. The axial cavity is divided into two halves by a compartment wall 214 that is parallel to the right side-wall 212 and left side-wall 213 and connects with the top side-wall 210 and bottom side-wall 211. The half of the axial cavity defined by the top side-wall 210, bottom side-wall 211, compartment wall 214 and right side-wall 212 is named as the right axial cavity and the other half of the axial cavity defined by the top side-wall 210, bottom side-wall 211, compartment wall 214 and left side-wall 213 is named as the left axial cavity. The right axial cavity has opposing first right opening 207a and second right opening 208a and the left axial cavity has opposing first left opening 207b and second left opening 208b. In addition, an indentation 219 is formed on the top of the compartment wall 214.

Located on the exterior of the main body 205 is a pair of tabs 201 and 202. One tab 202 is located on the right side-wall 212 and the other tab 201 is located on the left side wall 213. The tabs 201 and 202 are operative in supporting the adapter 200 on a surface. The inner cavity of the main body 205 contains a pair of parallel ridges 235 and 236 located on the inner surface of the bottom side-wall 211. The ridges 235 and 236 are perpendicular to the axial cavity of the main body 205 and divide the compartment wall 214 into two halves.

The ridges 235 and 236 define a groove 238 which is perpendicular to the axial cavity of the main body 205. The groove 238 is half way between the first openings 207a, 207b and second openings 208a, 208b of the main body 205. The width of the groove 238 is equal to the thickness of combined flanges 450 of the inner housing halves 410 and 420. The right side-wall 212 and left side-wall 213 each has a groove 239 that is collinear with the groove 238. Two indentations 237 are formed on the joint of the tab 202 with the right side-wall 212 and on the joint of the tab 201 with the left side-wall 213, respectively. The indentations 237 are in communication with and collinear with the grooves 239.

Located near the right opening 207a on the joint of the right side-wall 212 with the bottom side-wall 211 and on the joint of the compartment wall 214 with the bottom side-wall 211 are protrusions 262. The protrusions 262 are also located near the left opening 207b on the joint of the left side-wall 213 with the bottom side-wall 211 and on the joint of the compartment wall 214 with the bottom side-wall 211. Similarly, these protrusions 262 are also located near the openings 208a, 208b on the joints of the bottom side-wall 211 with the right side-wall 212, compartment wall 214 and left side-wall 213, respectively.

An access opening 250 is located on the top side-wall 210. The access opening 250 allows inner housing halves 410 and 420 to be inserted into the axial cavity of the main body 205 and also allows the main body 205 to be constructed by injection molding.

The inner housing halves 410 and 420 are identical. Each of the inner housing halves 410 and 420 is constructed of plastic by an injection molding process. Each half includes two hollow cylinders 440 and a rectangular flange 450 located at one end of the cylinder 440. Two halves 410 and 420 are connected at their respective flanges 450 respectively so as to define two common cylinders. Two flanges 450 define a thickness which is equal to the widths of the groove 238 and 239. The inner housing halves 410, 420 are placed in the main body 205 by aligning the flange 450 of the inner housing half 410 with collinear grooves 238 and 239 and sliding it into place within the main body 205. The other inner housing half 420 is inserted into the main body 205 in the same fashion.

The cylinders 440 of the inner housing halves 410 and 420 are coaxial in the main body 205 and define two common cylinders. Located in each of the common cylinders is a hollow sleeve 500 with a generally cylindrical shape. The cover 300 has a bottom surface 320 and a rectangular protruding portion 330 positioned on the bottom surface 320, wherein the protruding portion 330 is arranged corresponding to and can be placed with the indentation 219 on the compartment wall 214. A smaller protrusion 332 is formed on the protruding portion 330. The protrusion 332 has a rectangular bottom surface and a triangular cross-section. In addition, the cover 300 further includes a pair of ribs 310, which are positioned corresponding to the indentations 237 on the tabs 201, 202, respectively (See FIG. 5).

When desiring to assemble the fiber adapter 200, the inner housing halves 410 and 420 are inserted into the axial cavity of the main body 205 through the access opening 250. Afterward, the protrusion 332 on the cover 300 is ultrasonically melted and the cover 300 is brought to cover the access opening 250. At this moment the protruding portion 330 will be placed within the indentation 219 on the compartment wall 214 and the molten protrusion 332 will bond to the compartment wall 214 so that the cover 300 can be tightly attached to the main body 205. Since the ribs 310 of the cover 300 are arranged corresponding to the indentations 237 on the tabs 201 and 202, the ribs 310 will be placed within the indentations 237 when the cover 300 is brought to cover the access opening 250.

In operation the connector 100 is inserted into the main body 205 from, for example, the first right opening 207a. The shoulders 121 positioned on the opposite sides of the tab 126 of the spring latch 120 are pushed by the protrusions 262 to cause the spring latch 120 to be deflected downward during the insertion into the main body 205. The ferrule 140 of the connector 100 is inserted into one end of the hollow sleeve 500 in the right axial cavity. When the shoulders 121 pass over the protrusions 262, the spring latch 120 is then returned to its original position by its own restorative force to have the shoulders 121 moved upward to position behind the protrusions 262. The protrusions 262 can stop the backward movement of the shoulders 121 to prevent the connector 100 from being pulled out from the adapter 200. Another connector 100 can be inserted into the main body 205 from the second right opening 208a in the same manner to have its ferrule 140 to be inserted into the other end of the sleeve 500 in the right axial cavity. The end face of the ferrule 140 will be brought into contact with that of the previous ferrule 140. Similarly, two connectors 100 can be inserted into the main body 205 from the first left opening 207b and the second left opening 208b respectively to optically couple with each other.

In addition to duplex fiber adapter, the fiber adapter of the present invention can also be designed to couple four pairs of connectors (not shown in the figure). More specifically, the axial cavity in the main body of the adapter is divided into four parts by three parallel compartment walls. Four connectors can be inserted into the front ends of the four parts of the axial cavity respectively in the above-described manner. Similarly, another four connectors can be inserted into the rear ends of the four parts of the axial cavity to couple with the opposite connectors, respectively. Since the structure of this adapter is substantially identical to that of the adapter 200, any further illustrations of such adapter are omitted herein.

Since the main body of the fiber adapter according to the present invention is unitary, the prior art problem that the stresses cause the two halves of the adapter to separate from each other after time can be avoided.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A fiber adapter for optically coupling at least two connectors with each other, each said connector having a generally rectangular housing, a ferrule and a spring latch, the housing having an opening from which the ferrule protrudes, the spring latch having a first end and a second end opposite to the first end, the first end of the spring latch connecting to the outer surface of the housing, the second end of the spring latch movable in a direction, the spring latch having a pair of shoulders opposite to each other, the fiber adapter comprising:

an inner housing having a flange and a plurality of hollow cylinders through the flange;

a unitary main body having an axial cavity defined by a first side-wall, a second side-wall, a third side-wall and a fourth side-wall, the first side-wall facing the third side-wall and connecting with the second and fourth side-walls, the main body having two opposing axial openings, at least one compartment wall positioned in the axial cavity, the compartment wall parallel to the second and fourth side-walls and connecting with the first and third side-walls and dividing the axial cavity into a plurality of parts, the first side-wall having an access opening thereon, an indentation being formed on a top of the compartment wall, a pair of parallel ridges positioned on the inner surface of the third side-wall and dividing the compartment wall into two halves, the ridges defining a first groove, the second side-wall having a second groove on the inner surface thereof, the fourth side-wall having a third groove on the inner surface thereof, the first groove in communication with the second and third grooves, a plurality of protrusions located near the two axial openings on the inner surfaces of the second and fourth side-walls and on opposite sides of the compartment wall, respectively; and a cover configured to cover the access opening on the first side-wall, wherein the cover has a protruding portion formed thereon and a protrusion formed on the protruding portion, the protruding portion is positioned corresponding to the indentation on the top of the compartment wall, wherein the axial cavity of the main body is configured to receive the inner housing, the first, second and third grooves are configured to receive the flange of the inner housing, the access opening on the first side-wall is configured for the inner housing to place within the axial cavity of the main body, and the indentation on the top of the compartment wall is configured to receive the protruding portion and molten protrusion on the cover when the protrusion on the cover is melted and the cover is brought to cover the access opening.

2. The fiber adapter as claimed in claim 1, wherein the axial cavity of the main body is divided into two halves by the compartment wall.

3. The fiber adapter as claimed in claim 1, wherein the fiber adapter has three compartment walls to divide the axial cavity of the main body into four parts.

4. The fiber adapter as claimed in claim 1, wherein the cover further has a pair of ribs, a pair of tabs is disposed on the second and fourth side-walls, two indentations are formed on the joint of one tab with the second side-wall and on the joint of the other tab with the fourth side-wall respectively and are configured to receive the ribs.

5. The fiber adapter as claimed in claim 1, wherein the protruding portion on the cover is rectangular.

6. The fiber adapter as claimed in claim 5, wherein the protrusion on the protruding portion has a rectangular bottom surface and a triangular cross-section.

* * * * *